(12) United States Patent
Jiang et al.

(10) Patent No.: US 7,190,864 B2
(45) Date of Patent: Mar. 13, 2007

(54) FIBER COLLIMATING LENSES AND METHOD

(75) Inventors: Shibin Jiang, Tucson, AZ (US); Maohe Li, Tucson, AZ (US)

(73) Assignee: Beamtek, Inc., Tucson, AZ (US)

( * ) Notice: Subject to any disclaimer, the term of this patent is extended or adjusted under 35 U.S.C. 154(b) by 266 days.

(21) Appl. No.: 10/817,732

(22) Filed: Apr. 2, 2004

(65) Prior Publication Data

US 2005/0220401 A1    Oct. 6, 2005

(51) Int. Cl.
  *G02B 6/26*  (2006.01)
  *G02B 6/42*  (2006.01)
(52) U.S. Cl. .......................... 385/50; 385/27; 385/28; 385/31; 385/39; 385/43; 385/123; 385/124
(58) Field of Classification Search ............ 385/27–28, 385/31, 39, 43, 50, 123, 124
See application file for complete search history.

(56) References Cited

U.S. PATENT DOCUMENTS

| | | | |
|---|---|---|---|
| 4,701,011 A | 10/1987 | Emkey | |
| 5,384,874 A | 1/1995 | Hirai | |
| 5,457,759 A | 10/1995 | Kalonji et al. | |
| 5,774,607 A | 6/1998 | Shiraishi | |
| 5,815,611 A * | 9/1998 | Dhadwal | 385/12 |
| 6,014,483 A | 1/2000 | Thual | |
| 6,130,972 A | 10/2000 | Shiraishi | |
| 6,253,004 B1 | 6/2001 | Lee et al. | |
| 6,542,665 B2 | 4/2003 | Reed | |
| 6,594,419 B2 | 7/2003 | Ukrainczyk | |
| 6,598,429 B1 | 7/2003 | Jiang et al. | |

OTHER PUBLICATIONS

Kazuo K. Shiraishi et al. "A Fiber Lens with a Long Working Distance for Integrated Coupling Between Laser Diodes and Single-Mode Fibers", Journal of Lightwave Technology, vol. 13, No. 8, Aug. 1995, pp. 1736-1744.

Kazuo Shiraishi et al. "Beam Expanding Fiber Using Thermal Diffusion of the Dopant", Journal of Lightwave Technology, vol. I, No. I, Aug. 1990, pp. 1151-1161.

Kazuo Shiraishi et. al. "Spotsize Contraction in Standard Single-Mode Fibers by Use of a GI-Fiber Tip with a High Focusing Parameter", IEEE Photonics Technology Letters, vol. 10, No. 12 Dec. 1998, pp. 1757-1759.

Hidehiko Yoda et. al. "Cascaded GI-Fiber Chips with a Wedge-Shaped End for the Coupling Between an SMF and a High-Power LD with Large Astigmatism", Journal of Lightwave Technology, vol. 20, No. 8, Aug. 2002, pp. 1545-1548.

Akira Ogura et. al. "Efficient Coupling Between Laser Diodes with a Highly Elliptic Field and Single-Mode Fibers by Means of GIO Fibers", IEEE Photonics Technology Letters, vol. 13, No. 11, Nov. 2001, pp. 1191-1193.

* cited by examiner

Primary Examiner—Frank G. Font
Assistant Examiner—Michael P. Mooney
(74) Attorney, Agent, or Firm—Eric A. Gifford

(57) ABSTRACT

A compact, inexpensive and rugged fiber collimating lens and lens array achieve large beam diameters and provide long working distances. A special single-mode fiber is inserted between a standard single-mode input fiber and a GRIN fiber lens, typically quarter-pitch or slightly longer. The specialty fiber condenses the mode field diameter (MFD) of the beam in the input fiber into its smaller MFD. As a result, the fiber collimating lens provides greater beam expansion due to the larger divergence angle of the specialty fiber, which in turn provides longer working distances.

18 Claims, 6 Drawing Sheets

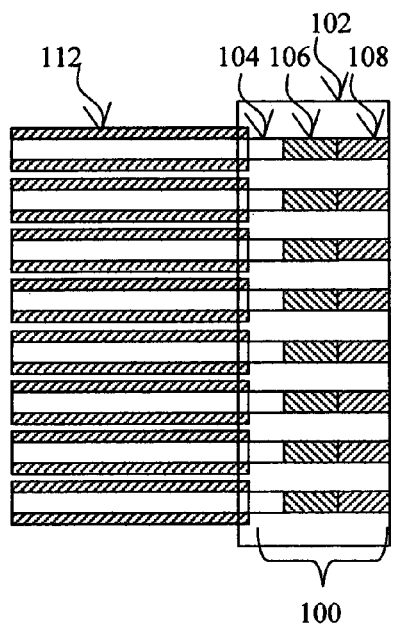 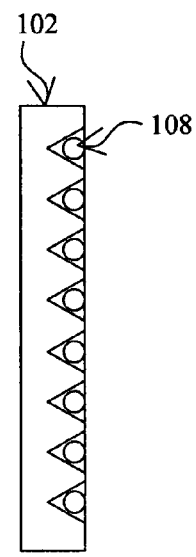
FIG. 7a  FIG. 7b
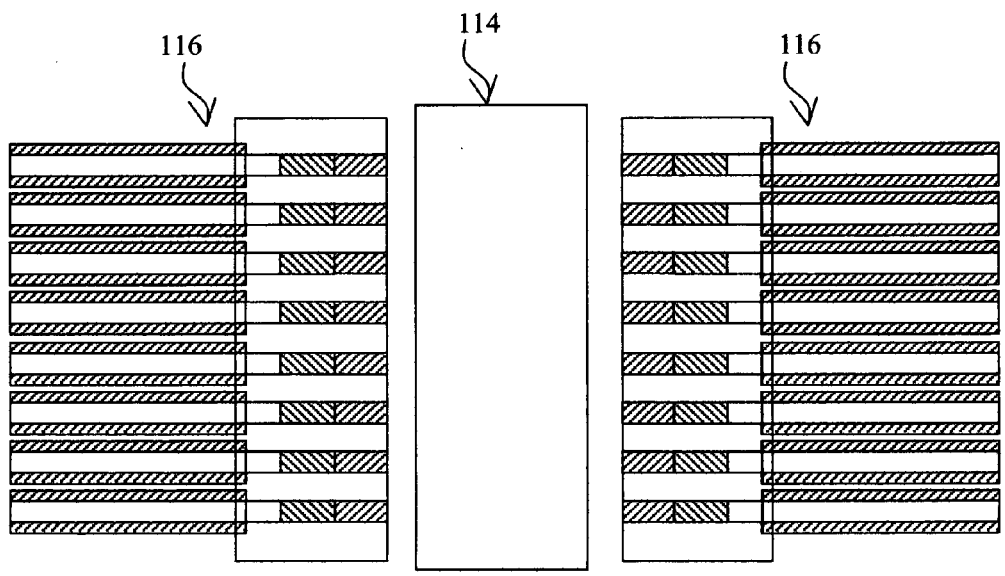
FIG. 7c

FIBER COLLIMATING LENSES AND METHOD

BACKGROUND OF THE INVENTION

1. Field of the Invention

This invention relates to optical fiber collimating lenses for coupling an optical beam in or out of optical communication components and devices, and more specifically to fiber collimating lenses that use a specialty single-mode fiber to expand and focus the light beam and provide long working distances.

2. Description of the Related Art

Graded refractive index (GRIN) lenses have been widely used in optical components and devices as collimating, focusing and coupling lenses. A GRIN lens has a refractive index whose value varies with radial distance from the axis of the lens. The refractive index of a square-law GRIN lens can be given by:

$$n^2(r) = n_0^2[1 - g^2 r^2] \quad (1)$$

where $n_0$ is the refractive index on the axis of the lens, r is the radial distance from the central axis, and g is the focusing parameter. In the GRIN lens, rays follow sinusoidal paths until reaching the back surface of the lens. A light ray that has traversed one pitch has traversed one cycle of the sinusoidal wave that characterizes that lens. Most conventional GRIN lenses are constructed with quarter pitch (¼ length of one cycle of the sinusoidal wave) length. The lens diameter (>1 mm) is a lot larger than the fiber diameter (125 microns), which complicates packaging and impacts reliability. Furthermore, the GRIN lenses are made by an ion exchange method, which is usually toxic and expensive.

Using a short length of a graded-index (GRIN) multimode optical fiber as a lens provides several advantages over the use of conventional GRIN lenses: small size, low cost, a common fiber/lens diameter, and a stable (fused) fiber/lens interface. The only limiting factors are the amount of beam expansion and the length of the working distance that can be achieved.

U.S. Pat. No. 4,701,011, issued to W. L. Emkey on Oct. 20, 1987, discloses a method of fusing an appropriate length GRIN fiber to the endface of a single-mode fiber to replace conventional quarter-pitch GRIN lens. The GRIN fiber is thus used as a lens, but provides many advantages over conventional quarter-pitch GRIN lenses epoxied to the fiber endfaces. In particular, the misalignment associated with the epoxied arrangement is reduced since the GRIN fiber can be chosen to comprise the same outer diameter as the single mode fiber. Additionally, the use of a section of optical fiber as a lens allows for a fused connection to be used instead of an epoxied connection, which results in a more stable and rugged interface between the fiber and the lens. The fabrication method and performance analysis for the lens were also reported by W. L. Emkey in Journal of Lightwave Technology, LT-5(9), 1987, pp. 1156–1164.

U.S. Pat. No. 6,542,665 B2, issued to W. A. Reed on Apr. 1, 2003, discloses a method to improve the parameters of the GRIN fiber lens. Specifically, the GRIN fiber lens has a radial profile for the refractive index that increases the Rayleigh range of the emitted beam. The increased Rayleigh range improves beam collimation so that the fiber may couple to other optical device over larger distance ranges.

U.S. Pat. No. 6,014,483, issued to M. Thual on Jan. 11, 2000, disclosed a method that includes fusing a fracture of pure silica coreless fiber of a specified length between the GRIN fiber and the single-mode fiber. In the Thual patent, the role of the silica is to spatially extend the output light beam from the single-mode fiber. The length must be carefully controlled to ensure the diameter of the beam is not larger than the fiber. This extension makes it possible to use the entire graded-index volume. The graded-index section is then exploited to the maximum extent as a lens since the volume occupied by the light beam is equal to the graded-index volume. With a silica section interposed between the graded-index lens and the single-mode fiber, the maximum mode diameter is 80 µm instead of 28 µm and the maximum distance between fibers is 1.8 mm instead of 460 µm, the coupling loss being equivalent in both cases (0.5 dB).

U.S. Pat. No. 5,774,607, issued to K. Shiraishi on Jun. 30, 1988, discloses a method of forming a fiber lens by fusing a square-law index fiber between the single-mode fiber and a coreless fiber having a hemispherical surface. The method was analyzed by K. Shiraishi in Journal of Lightwave Technology, 15(2), 1997, pp. 356–363.

U.S. Pat. No. 6,594,419 B2, issued to L. Ukrainczyk on Jul. 15, 2003, discloses a fiber lens formed by joining a single-mode fiber to a tapered graded-index multimode fiber as shown in FIG. 4 of the patent.

U.S. Pat. No. 6,130,972, issued to K. Shiraishi on Oct. 10 2000, discloses a fiber lens formed by cascaded joining of a single mode fiber with two graded index multimode fiber which have different square-low index distributions. The second multimode fiber may either have a convex distal end surface or be connected with an isotropic coreless fiber having a convex distal end. The method was also reported by K. Shiraishi, etc. in Journal of Lightwave Technology, 18(6), 2000, pp. 787–2000

U.S. Pat. No. 5,384,874 issued to S. Hirai on Jan. 24, 1995 discloses a fiber lens. In the Hirai patent a rod lens having a diameter not largely different from an outer diameter of an optical fiber is integrally connected to an optical single mode fiber. If the diameter of the graded-index optical fiber is larger than the single mode fiber, more of the light transmitted through the latter fiber can be entered into the former or a larger-diameter beam of mutually parallel rays can be obtained and it is easier to confirm a reference point for setting the length of the former fiber at the cutoff thereof.

There remains an acute need for a GRIN fiber lens that can expand the light beam to larger diameters and increase the working distance.

SUMMARY OF THE INVENTION

The present invention provides a compact, inexpensive and rugged fiber collimating lens and lens array that achieve large beam diameters and provide long working distances.

This is accomplished by splicing a special single-mode fiber between a standard single-mode input fiber such as Corning SMF-28 and a GRIN fiber lens, typically quarter-pitch or slightly longer. The specialty fiber condenses the mode field diameter (MFD) of the beam in the input fiber into its smaller MFD. As a result, the fiber collimating lens provides greater beam expansion due to the larger divergence angle of the specialty fiber, which in turn provides longer working distances.

These and other features and advantages of the invention will be apparent to those skilled in the art from the following detailed description of preferred embodiments, taken together with the accompanying drawings.

BRIEF DESCRIPTION OF THE DRAWINGS

FIGS. 7a through 7c are views of a fiber collimating lens array; and

DETAILED DESCRIPTION OF THE INVENTION

The present invention provides a compact, inexpensive and rugged fiber collimating lens and lens array that collimate the light beam to provide a large beam diameter and long working distances. The fiber collimating lens is reversible, collimated light propagating in the GRIN fiber can be focused from a larger beam diameter into the standard SMF.

The problem with the SMF/GRIN fiber assembly is that the beam propagation characteristics of the standard SMF are not well matched to the fiber GRIN lens. As a result the optical beam can not expand to fill the multimode core of the GRIN fiber, which in turn limits the working distance of the fiber collimating lens. The mode field diameter (MFD), where the electric and magnetic field strengths are reduced to 1/e of their maximum values, i.e., the diameter at which power is reduced to $1/e^2$ of the maximum power in a single-mode fiber, of a standard SMF such as SMF-28 is relatively large. Typical values are 10.4 microns at 1550 nm and 9.2 microns at 1310 nm. A large MFD produces a small divergence angle at the interface between the SMF and the GRIN fiber thereby limiting beam expansion and under utilizing the large multimode core. Another way to view the problem is that the numerical aperture (NA) of the SMF is much smaller than the NA of the GRIN fiber, typically 0.14 compared to 0.2–0.6. If the MFD of the standard communication single mode fiber could be reduced or NA increased this problem could be alleviated. However, this is not practical because a smaller MFD will increase the propagation loss and optical nonlinearity of the signal beam in the fiber. In long-haul fiber networks an optical signal may travel thousands kilometers so propagation loss and linearity are critical parameters.

Figure 1A:
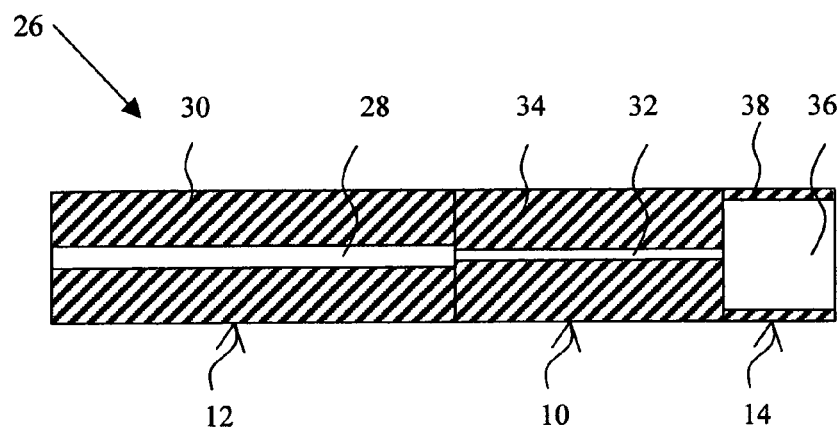
FIGS. 1a and 1b are side views of a fiber collimating lens and the beam's changing mode field diameter in accordance with the present invention.
Figure 1B:
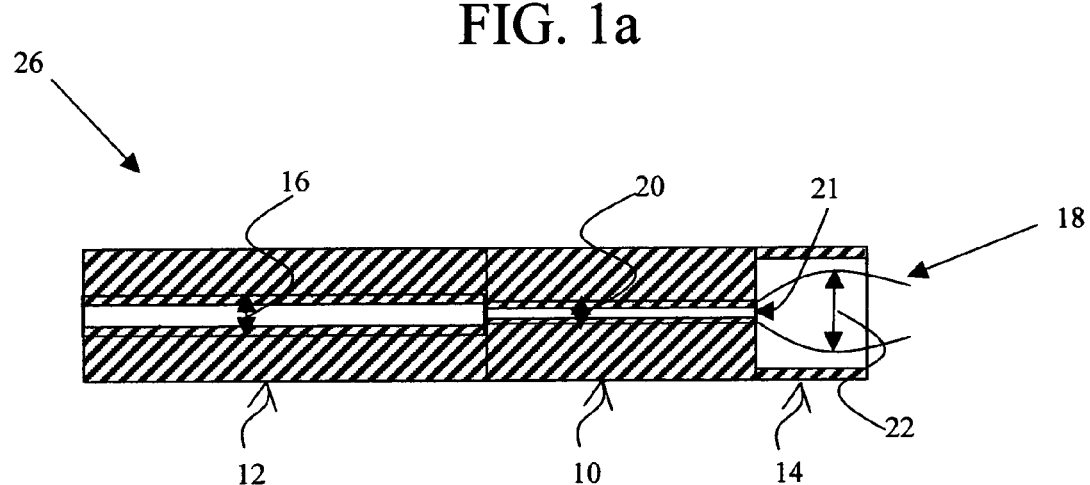

As shown in FIGS. 1a and 1b, a section of specialty single-mode fiber 10 is spliced between an input single-mode fiber 12 and a section of graded-index multimode (GRIN) fiber 14 to effectively match the SMF to the GRIN fiber without negatively effecting propagation loss or non-linearity. The specialty fiber 10 condenses the MFD 16 of the beam 18 propagating in the single-mode fiber 12 to a smaller MFD 20 in the specialty fiber. The smaller MFD 20 produces a larger divergence angle 21 at the input to the GRIN fiber, allowing the beam 18 to expand more quickly into a larger beam diameter 22 to approximately fill the multimode core 24 of GRIN fiber 14. The MFD 20 of the specialty fiber is preferably selected to confine the expanded beam to the multimode core to avoid refraction and large optical losses. A beam diameter of at least 60% of the multimode core, preferably 80% and most preferably 95% is desired. As a result, the fiber collimating lens 26 (the three spliced fibers) provides longer working distances and greater beam expansion than conventional fiber collimating lenses.

In general, the input single-mode fiber 12 will have a MFD of 8–12 microns at the benchmark wavelength for long-haul transmission of 1550 nm. The fiber has a core 28 of 7–10 microns in diameter and a cladding 30 having an outer diameter of 125 microns. A very common input fiber is Corning SMF-28, which has a MFD of approximately 10.4 microns at 1550 nm and 9.2 microns at 1310 microns, a core of 8.2 microns and an outer cladding diameter of 125 microns. The specialty single-mode fiber 10 has a MFD of typically 1–6 microns. The fiber has a core 32 suitably 1–6 microns in diameter and a cladding 34 having the same outer diameter as the standard single-mode fiber, e.g. 125 microns. The length of the specialty fiber is not critical; it need only be long enough to condense the beam's MFD. Lengths of 2 mm–50 mm are typical. The GRIN fiber 14 has a multimode core 36 suitably 50–300 microns in diameter and a cladding 38 having an outer diameter of suitably 125–400 microns. The length of the GRIN fiber is typically quarter-pitch or slightly longer to maximize the beam waste diameter or working distance. The length may be a multiple of quarter-pitch. These fibers are typically but not necessarily undoped silica glass fiber.

Figure 2:
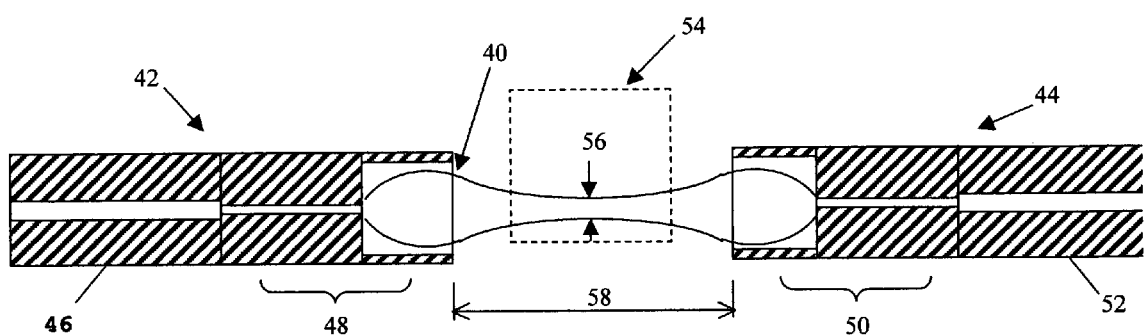
FIG. 2 is a side view of a pair of fiber collimating lenses used for light coupling.

As shown in FIG. 2, in many optical systems a light beam 40 is coupled from one fiber collimating lens 42 to a second symmetrically arranged fiber collimating lens 44. The light from the single-mode fiber 46 is collimated by one specialty fiber and GRIN fiber lens pair 48. The other fiber GRIN fiber lens and specialty fiber pair 50 collects the light beam and focuses it into the other single-mode fiber 52. Free space or optical waveguide components and devices 54 can be inserted between the two GRIN fiber lenses. The distance between the two GRIN fibers, which is twice the position $z_w$ of the beam waist (MFD$_0$) 56, is defined as working distance 58. The working distance determines how big the optical components or devices 54 can be that are inserted between the fiber lens pairs. The beam waist affects the coupling efficiency, i.e., the loss. Big waists provide larger tolerance for the pair alignment and coupling.

The light in the fiber lens can be analyzed as a Gaussian beam shown. After leaving the lens, the beam 40 is characterized by its waist diameter (MFD$_0$) and position ($z_w$) as:

$$MFD_0 = \frac{2\lambda}{\pi n_0 g w_o \left[\sin^2(gl) + \left(\frac{\lambda}{\pi n_0 g w_0^2}\right)^2 \cos^2(gl)\right]^{1/2}} \text{ and} \quad (2)$$

$$z_w = \frac{\left[1 - \left(\frac{a_0}{n_0 g}\right)^2\right] \sin(gl)\cos(gl)}{n_0 g \left[\sin^2(gl) + \left(\frac{a_0}{n_0 g}\right)^2 \cos^2(gl)\right]} \quad (3)$$

where $w_0$ is the mode field radius of the single mode fiber, l the lens length, and $a_0$ is given by $$a_0 = \frac{\lambda}{\pi w_0^2},$$

$n_0$ is the refractive index on the axis of the lens, g is the focusing parameter, and $\lambda$ is the light wavelength.

Figure 3:
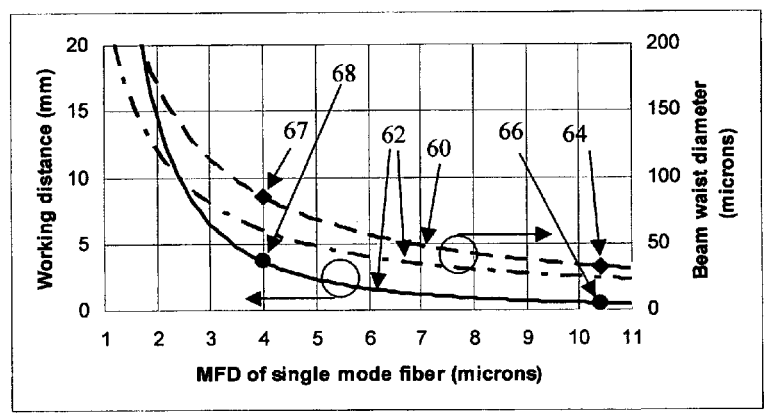
FIG. 3 illustrates the influence of MFD on the working distance and beam waist diameter of the fiber collimating lens.

FIG. 3 shows the influence of MFD of the single mode fiber, either the standard SMF or the specialty fiber, on the working distance and beam waist diameter output by a standard graded index fiber lens for a quarter pitch GRIN fiber (plot 60) and a slightly longer than quarter pitch GRIN fiber (plot 62). Both the beam waist and working distance increase when the MFD of the single mode fiber decreases.

As discussed the standard communication single mode fibers have a relatively large MFD, such as SMF-28 whose MFD is 10.4 µm at 1550 nm. MFDs of 8–12 µm are typical at normal operating wavelengths. For a MFD of 10.4 µm at 1550 nm, the maximum beam diameter 64, approximately 32.8 µm, exists when the lens length is quarter pitch (plot 60). The maximum working distance 66, which is only 488 µm, occurs when the lens length is slightly longer than the quarter pitch (plot 62). The corresponding beam waist is only about 24.4 µm. Such small beam and short working distance is bad both for light coupling and operation and makes reliable packaging more complex and expensive, and sometimes impossible.

The insertion of the specialty single-mode fiber between the input fiber and the GRIN fiber effectively reduces the mode field diameter of the input fiber thereby shifting to the left in FIG. 3. In the example just described, the specialty single-mode fiber condenses the MFD from 10.4 µm in the input fiber to 4 µm in the specialty fiber. As a result, the maximum beam diameter 67 is about 86 µm at quarter pitch. The maximum working distance 68 is about 3660 µm when the lens is slightly longer than quarter pitch and the beam waist is still 60.6 µm. The improvement in both beam diameter and working distance is dramatic.

As mentioned above, the nature of the problem and the solution provided by the insertion of the specialty fiber can also be characterized in terms of Numerical Aperture (NA). The Numerical Aperture of a fiber is a measure of divergence of the propagating optical beam and is defined for both single-mode and multimode fibers as:

$$NA = (n_{core}^2 - n_{cl}^2)^{1/2} \quad (4)$$

where $n_{core}$ is the refractive index of the core of a step-index fiber or the refractive index at the center of the core of a graded-index fiber and $n_{cl}$ is the refractive index of the fiber cladding. A standard SMF has a NA of 0.08–0.17 and typically about 0.14 whereas a typical multimode GRIN fiber has a NA of approximately 0.2–0.6. Consequently, the light diverging from the SMF fiber does not expand fast enough to fill the multimode core, resulting in small beam diameters and short working distances. The NA of the SMF can not be increased to match the GRIN fiber because of the overriding concerns of propagation loss and nonlinearity in optical communications networks.

The specialty single-mode fiber is selected to have an NA approximately matched to that of the multimode GRIN fiber. In practice the NA of the specialty fiber is preferably slightly smaller to ensure confinement of the beam within the multimode core to avoid refraction. As a result, the light diverging from the specialty single-mode fiber expands quickly to approximately fill the multimode core, resulting in a large beam diameter and a longer working distance.

A single-mode fiber's MFD and its NA are related in that a high NA aperture corresponds to a small MFD. In other words, in order to confine the beam in a small MFD it should have a large NA and thus have a large divergence angle. MFD and NA differ in that NA is solely a function of the refractive indices of the core and cladding glass whereas MFD is a function of NA and diameter of the core of the fiber. By convention, MFD is typically used to calculate beam propagation in single-mode fibers.

The capability to expand the beam to larger diameters and to work with longer working distances in a small, inexpensive and rugged fused fiber lens will find applications throughout the communications industry. For example, such collimators and collimator array can be used for switches, add-drop devices, isolators, circulators, etc.

Figure 4A:
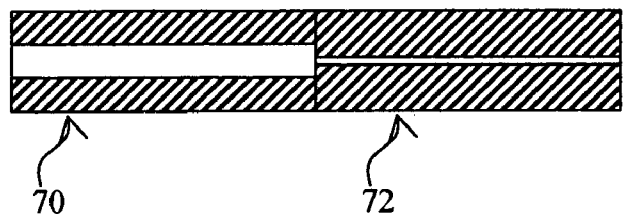
FIGS. 4a through 4b are side views for illustrating manufacturing processes for the fiber collimating lens according to the present invention.
Figure 4B:
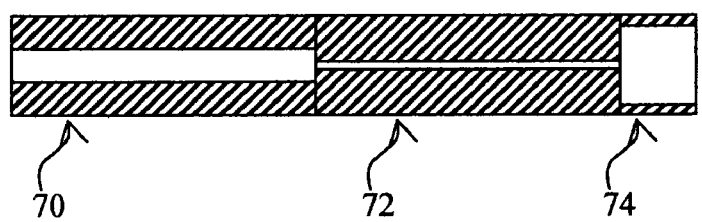

As shown in FIGS. 4a and 4b, the fiber collimating lens is fabricated using standard fiber processing techniques. A single-mode input fiber 70 and a specialty single-mode fiber 72 are cleaved and fused together. Pre-fuse of the special fiber may be needed to assure low loss. The specialty single-mode fiber 72 is cleaved to a desired length. Next, the graded index multimode fiber 74 is cleaved and fused to the distal end of the specialty fiber. The multimode fiber 74 is cleaved to a desired length, quarter pitch or slightly longer. The distal end of the multimode fiber 74 is subjected to polishing or electric discharge processing to smooth the surface.

In the following embodiments, the single-mode input fiber is SMF-28, although other standard single-mode fibers such as LEAF optical fiber can be used. For comparison, the properties of a fiber collimating lens constructed by fusing SFM-28 to a GRIN fiber are also shown ("Control").

Embodiment 1

The specialty single mode fiber 10 (4 µm MFD at 1550 nm) is sandwiched between the input single mode fiber 12 (SMF-28 with MFD 10.4 µm at 1550 nm) and the graded index multimode fiber lens 14 (62.5/125). The quarter pitch length, beam waist, and maximum working distance are given in Table 1.

TABLE 1

| Parameters | Embodiment 1 | Control |
| --- | --- | --- |
| Quarter pitch length (µm) | 266 | 266 |
| Beam waist diameter at quarter pitch length (µm) | 56 | 21.6 |
| Maximum working distance (mm) | 1.78 | 0.18 |
| Beam waist diameter at maximum working distance (µm) | 40 | 17 |

The specialty single mode fiber 10 (3.3 µm MFD at 1310 nm) is sandwiched between the input single mode fiber 12 (SMF-28 with MFD 9.2 µm at 1310 nm) and the graded index multimode fiber lens 14 (62.5/125). The quarter pitch length, beam waist, and maximum working distance are given in Table 2.

TABLE 2

| Parameters | Embodiment 1 | Control |
| --- | --- | --- |
| Quarter pitch length (µm) | 266 | 266 |
| Beam waist diameter at quarter pitch length (µm) | 57.4 | 20.6 |
| Maximum working distance (mm) | 1.97 | 0.204 |
| Beam waist diameter at maximum working distance (µm) | 40.4 | 16 |

Embodiment 2

Figure 5:
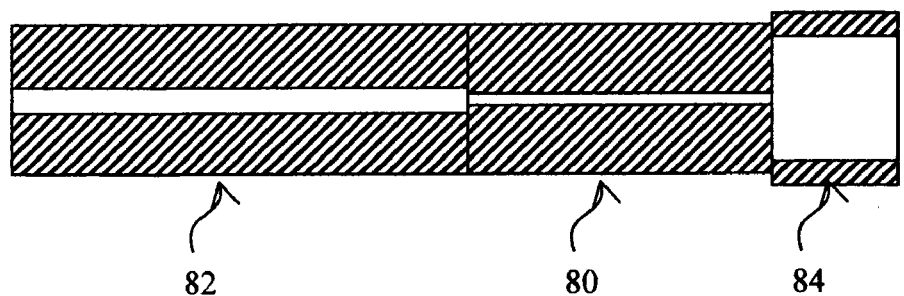
FIG. 5 is a side view of an alternate embodiment of the invention.

A specialty single mode fiber 80 (4 µm MFD at 1550 nm) is sandwiched between a single mode input fiber 82 (SMF-28 with MFD 10.4 µm at 1550 nm) and a graded index multimode fiber lens 84 (100/140). As shown in FIG. 5 the outer diameter of the lens fiber 84 is a little bigger than the 125 μm standard diameter of the SMF fiber. The quarter pitch length, beam waist, and maximum working distance are given in Table 3.

TABLE 3

| Parameters | Embodiment 1 | Control |
|---|---|---|
| Quarter pitch length (μm) | 404 | 404 |
| Beam waist diameter at quarter pitch length (μm) | 86 | 32.8 |
| Maximum working distance (mm) | 3.66 | 0.488 |
| Beam waist diameter at maximum working distance (μm) | 60.6 | 24.4 |

The specialty single mode fiber 80 (3.3 μm MFD at 1310 nm) is sandwiched between single mode input fiber 82 (SMF-28 with MFD 9.2 μm at 1310 nm) and graded index multimode fiber lens 84 (100/140). The quarter pitch length, beam waist, and maximum working distance are given in Table 4.

TABLE 4

| Parameters | Embodiment 1 | Control |
|---|---|---|
| Quarter pitch length (μm) | 404 | 404 |
| Beam waist diameter at quarter pitch length (μm) | 87.2 | 31.2 |
| Maximum working distance (mm) | 4.55 | 0.535 |
| Beam waist diameter at maximum working distance (μm) | 61 | 23 |

Embodiment 3

Figure 6A:
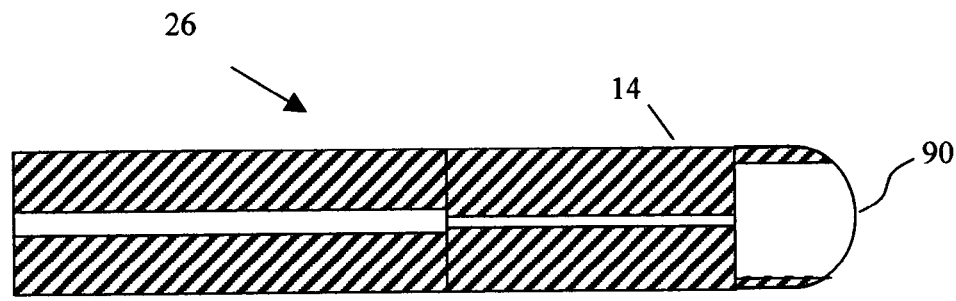
FIGS. 6a and 6b are side views of another embodiment of the invention.

To further increase the working distance of the fiber collimating lens 26, the distal end of the GRIN fiber 14 can be formed with a convex surface 90 as shown in FIG. 6a. The convex surface can be formed by heat melting based on electric discharge, or chemical etching.

Figure 6B:
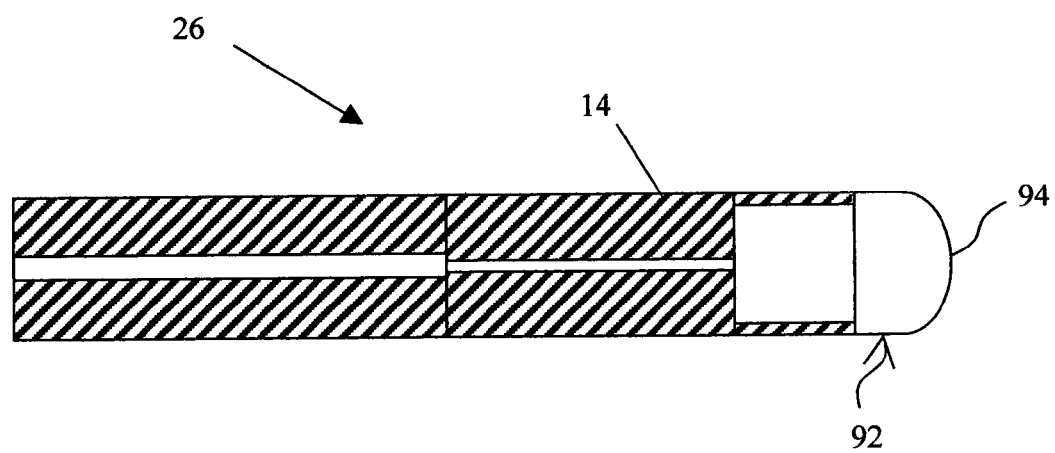

Alternately, a coreless fiber 92 having a uniform refractive index can be fused to the distal end of the GRIN fiber 14. The distal end of the coreless fiber is melted to form a hemispherical surface 94 by heating based on electric discharge, or chemical etching, as shown in FIG. 6b.

Embodiment 4

Because the fiber collimating lens 100 can have the same outer diameter as standard communication optical fiber, fiber lenses can be easily arrayed in a standard optical benches such as a V-groove array 102 as shown in FIGS. 7a–7b. The fiber collimating lens 100 (input SMF fiber 104, specialty single-mode fiber 106 and GRIN fiber 108) is formed on the end of a longer strand of standard SMF fiber 104 with a jacket 112, suitably 250 μm. Less alignment is required for the array because the dimension of every part is standard. As shown in FIG. 7c, free space optical components and devices 114 can be inserted between two fiber lens arrays 116. The entire device can be miniaturized, reducing both cost and size. For example, the fiber lens array can allow use of smaller micro-electro-mechanical-systems (MEMS) mirrors in optical switches.

Embodiment 5

Figure 8:
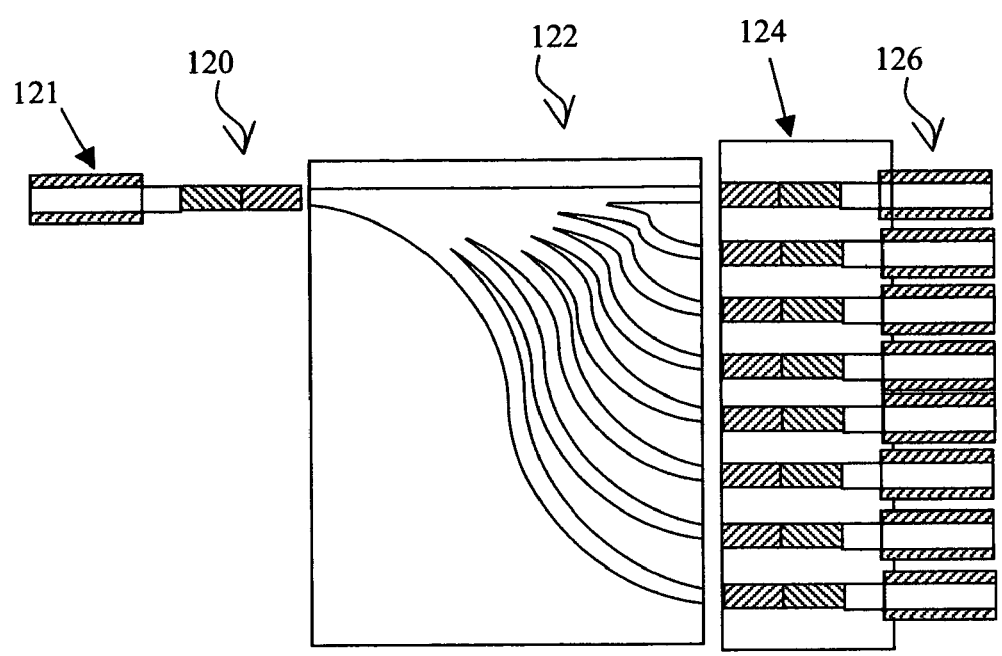
FIG. 8 is a side view of the fiber lens and array used in waveguide components such as AWG.

In the above embodiments, the fiber lenses work as light collimators. The fiber lenses can also work as a coupling lens for waveguide components. Typically, the waveguides have a different mode field diameter from standard optical fiber. To change the lens length, the spot size and working distance of the fiber lens can be tailored in a very larger range. Such a property has important applications in waveguide components. For example, a fiber lens with about half-pitch or one pitch length can provide a smaller spot size and better coupling tolerance with an array waveguide grating (AWG) than standard fiber coupling. As shown in FIG. 8, a single fiber lens 120 couples light from a standard SMF fiber 121 into an AWG 122. A fiber lens array 124 collects light from the AWG and couples it into standard SMF fibers 126.

While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

We claim:

1. A fiber collimating lens, comprising:
   a first single mode optical fiber having a first mode field diameter (MFD) at a beam wavelength;
   a second single mode optical fiber spliced to the first single mode fiber, said second single mode optical fiber having a MFD smaller than the MFD of the first single mode optical fiber at the beam wavelength; and
   a graded index multimode optical fiber spliced to the second single mode fiber.

2. The fiber collimating lens of claim 1, wherein the first single mode optical fiber has a core diameter of 7–10 microns, the second single mode optical fiber has a core diameter of 1–6 microns and the graded index multimode optical fiber has a core diameter of 50–300 microns.

3. The fiber collimating lens of claim 2, wherein all three fibers have the same outer diameters.

4. The fiber collimating lens of claim 2, wherein said first and second single mode optical fibers have the same outer diameter and said graded index multimode fiber has a larger outer diameter.

5. The fiber collimating lens of claim 1, wherein the length of the graded index multimode optical fiber is a multiple of quarter-pitch or slightly longer.

6. The fiber collimating lens of claim 1, wherein the distal endface of the graded index multimode optical fiber is convex.

7. The fiber collimating lens of claim 1, further comprising:
   a coreless fiber spliced to the graded index multimode optical fiber, the distal endface of the coreless fiber being convex.

8. The fiber collimating lens of claim 1, wherein the graded index multimode optical fiber supports a beam diameter of at least 60% of its core diameter.

9. The fiber collimating lens of claim 8, wherein the graded index multimode optical fiber supports a beam diameter of at least 80% of its core diameter but less than 100%.

10. The fiber collimating lens of claim 1, wherein the first MFD is 8–12 microns and the second MFD is 1–6 MFD at a beam wavelength of 1550 nm.

11. The fiber collimating lens of claim 1, wherein the first single-mode optical fiber has a core diameter of approximately 8.2 microns, an outer cladding diameter of approximately 125 microns and a MFD of approximately 10.2 microns at 1550 nm, said second second-mode fiber having a core diameter of 1–6 microns, an outer cladding diameter of approximately 125 microns and a MFD of 1–6 microns at 1550 nm, and said graded index multimode optical fiber has a core diameter of 50–300 microns.

12. The fiber collimating lens of claim 1, wherein the second single mode optical fiber has a numerical aperture that is greater than that of said first single mode optical fiber and approximately matched to that of said graded index multimode optical fiber.

13. A fiber collimating lens array, comprising:
a substrate having a plurality of parallel channels,
a plurality of fiber collimating lenses in the respective parallel channels, each said fiber collimating lens comprising:
 a first single mode optical fiber;
 a second single mode optical fiber spliced to the first single mode fiber; and
 a graded index multimode optical fiber spliced to the second single mode fiber, said second single mode optical fiber having a mode field diameter that is smaller than that of said first single mode optical fiber, said fibers all having the same outer diameter.

14. A fiber collimating lens, comprising:
a first single mode optical fiber;
a second single mode optical fiber spliced to the first single mode fiber; and
a graded index multimode optical fiber spliced to the second single mode fiber, said second single mode optical fiber having a numerical aperture (NA) that is greater than that of said first single mode optical fiber and is approximately matched to that of said graded index multimode optical fiber.

15. The fiber collimating lens of claim 14, wherein the NA of the first single mode optical fiber is 0.08–0.17 the NA of the second single mode optical fiber is 0.2–0.6 and the NA of the graded index multimode optical fiber is slightly larger than that of the second single mode optical fiber.

16. A fiber collimating lens, comprising:
a first single mode optical fiber having a first mode field diameter (MFD) at a beam wavelength;
a graded index multimode optical fiber spliced to the second single mode fiber; and
a second single mode optical fiber spliced between the first single mode fiber and the graded index multimode optical fiber, said second single mode optical fiber configured to condense an optical beam propagating in the first single mode optical fiber into a smaller MFD and to couple the condensed optical beam to the graded index multimode fiber with a divergence angle that rapidly expands the optical beam to approximately fill the core of the multimode fiber.

17. The fiber collimating lens of claim 16, wherein the second single mode optical fiber has a second MFD diameter less than the first MFD.

18. The fiber collimating lens of claim 16, wherein said second single mode optical fiber has a numerical aperture (NA) that is greater than that of said first single mode optical fiber and is approximately matched to that of said graded index multimode optical fiber.

* * * * *